United States Patent [19]
Lemarquand et al.

[11] Patent Number: 5,304,876
[45] Date of Patent: Apr. 19, 1994

[54] ELECTROMAGNETIC BEARING

[75] Inventors: Guy Lemarquand, Villaz; Didier Pierrejean, Sevrier; Denis Perrillat-Amede, Annecy, all of France

[73] Assignee: Alcatel Cit, Paris, France

[21] Appl. No.: 13,048

[22] Filed: Feb. 4, 1993

[30] Foreign Application Priority Data

Feb. 5, 1992 [FR] France .................. 92 01278

[51] Int. Cl.$^5$ .............................................. H02K 7/09
[52] U.S. Cl. ................................................ 310/90.5
[58] Field of Search ...................... 310/90.5, 68 B; 318/650, 652, 629, 632

[56] References Cited

U.S. PATENT DOCUMENTS

| | | | |
|---|---|---|---|
| 3,458,239 | 7/1969 | Dorsman ...................... | 310/90.5 |
| 3,823,990 | 7/1974 | Gilinson, Jr. .................. | 310/90.5 |
| 3,845,996 | 11/1974 | Geweke ........................ | 310/90.5 |
| 3,954,024 | 5/1976 | Staats .......................... | 310/90.5 |
| 4,121,143 | 10/1978 | Habermann et al. ......... | 310/90.5 X |
| 4,245,869 | 1/1981 | Scheffer et al. .............. | 310/90.5 |
| 4,686,404 | 8/1987 | Nakazeki et al. ............. | 310/90.5 |

FOREIGN PATENT DOCUMENTS 2239038 2/1975 France .
2322294 3/1977 France .

*Primary Examiner*—William H. Beha, Jr.
*Attorney, Agent, or Firm*—Sughrue, Mion, Zinn, Macpeak & Seas

[57] ABSTRACT

An electromagnetic bearing including a stator portion having sixteen magnetic cores facing the rotor portion. The sixteen cores are divided into four groups of four cores, and each group is equipped with suspension electric windings disposed such that the magnetic flux produced thereby is in the same direction in the first two cores of the group and in the opposite direction in the following two cores, each core in each group further being equipped with a position-detection electric coil, the coils on the four cores in any one group being connected together in series and powered by an AC electric current, the magnetic flux produced by the coils at any determined time being in opposite directions in the first two cores of any group, and also in opposite directions in the following two cores.

6 Claims, 2 Drawing Sheets

ELECTROMAGNETIC BEARING

The present invention relates to an electromagnetic bearing.

BACKGROUND OF THE INVENTION

U.S. Pat. No. 4,245,869 describes an electromagnetic bearing including a rotor element secured to the rotary mobile to be supported, and a stator element including eight cores, each core being equipped with a drive coil, and a detection coil. It is particularly advantageous for the position detectors to be associated with the bearing itself, because, in this way, the position of the mobile is measured in the plane of action of the forces due to the drive coils of the bearing. Furthermore, by using such a disposition it possible to reduce the size and the cost of the functions of suspension and position detection.

However, in that document, the four drive coils of the bearing on each of the X and Y axes are all powered together in series and not separately in pairs, so that the rotor being off-center cannot be corrected.

OBJECT AND SUMMARY OF THE INVENTION

An object of the present invention is to provide an electromagnetic bearing of the combined type, associating the two functions of position detection and positioning by means of drive coils, in which the position-detection coils are not influenced by the magnetic flux of the drive coils, and, naturally, in which the drive coils of each of the X and Y axes are powered separately half-axis by half-axis.

The invention therefore provides a magnetic bearing for radially suspending a rotor in a stator, the bearing including a magnetic circuit comprising a rotor first portion integral with said rotor, and a stator second portion integral with said stator, said stator portion including a plurality of magnetic cores facing the rotor first portion and equipped both with position-detection electric coils, powered by a detection AC electric current, and also with suspension electric windings powered by power currents, wherein said stator portion of the magnetic circuit includes sixteen of said magnetic cores divided into four groups of four consecutive cores, the four groups being referred to respectively as group I, group II, group III, and group IV and succeeding one another in that order, groups I and III corresponding to radial action along a Y-axis and in respective opposite directions, and groups II and IV corresponding to radial action along an X-axis perpendicular to the Y-axis and in respective opposite directions, each core in each group being equipped with a position-detection electric coil, the coils on the four cores in any one group being connected together in series, and the respective winding directions of the coils on the cores being such that, at any determined time, the magnetic flux produced by the AC powering current is in opposite directions in the first two cores of the group, and also in opposite directions in the following two cores, and wherein each group is further equipped with suspension electric windings disposed on the cores of the group such that, at any determined time, the magnetic flux produced by the powering current is in the same direction in the first two cores of the group, and in the opposite direction in the following two cores, the windings in each group being powered separately.

In a preferred embodiment, the position-detection electric coils in groups I and III are connected together and powered in series, and, in the same way, the coils in groups II and IV are connected together and powered in series.

According to another feature, said position-detection coils are powered by AC of constant amplitude at a frequency lying in the range 10 kHz to 100 kHz, and each set of two groups of coils connected in series is mounted in a measuring bridge which is balanced when the rotor is centered in the stator along the X-axis or the Y-axis corresponding to the two groups of coils connected in series, the bridge being powered via one of its diagonals, with the other diagonal being used to measure the imbalance voltage corresponding to the rotor moving off-center.

In a first embodiment, each group of cores is equipped with two suspension electric windings, the first winding surrounding the first two cores of the group together, and the second winding surrounding the third and fourth cores of the group together, the two windings being connected together and powered in series.

In a second embodiment, each group of cores is equipped with four suspension electric windings connected together and powered in series, one winding being disposed on each core of the group.

BRIEF DESCRIPTION OF THE DRAWINGS

An embodiment of the invention is described by way of example with reference to the accompanying drawings, in which.

DETAILED DESCRIPTION

Figure 1:
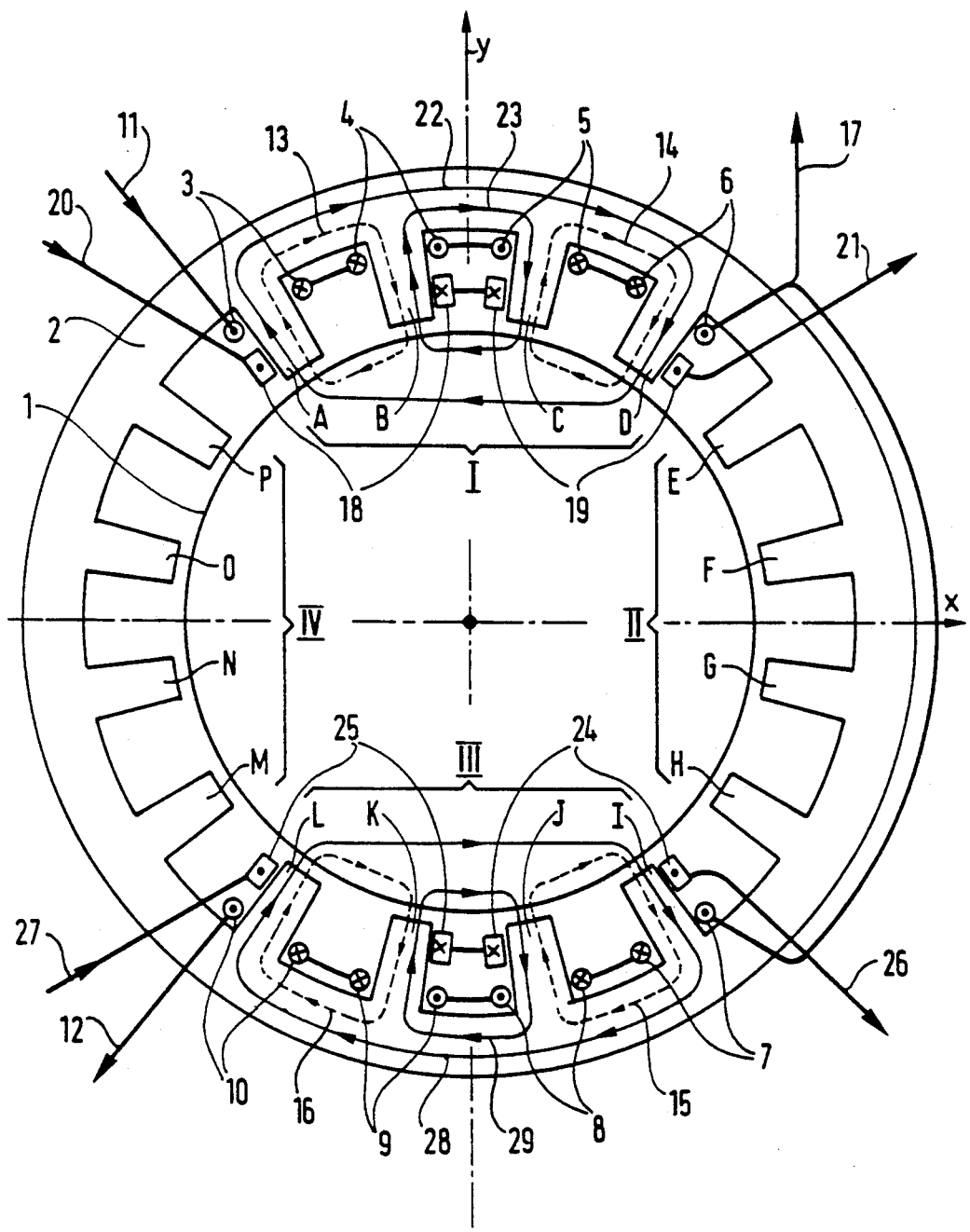
FIG. 1 is a diagrammatic view showing a magnetic bearing of the invention.

With reference to FIG. 1, the magnetic bearing includes a magnetic circuit comprising a rotor first portion 1, which is naturally integral with the rotor to be supported, and a stator second portion 2, which is naturally integral with the stator of the machine.

The stator portion 2 includes sixteen magnetic cores referenced A to P facing the rotor portion 1. The magnetic cores are equipped both with position-detection electric coils and also with suspension electric windings, in a manner described below. The sixteen above-referenced cores are divided into four groups: group I comprising cores A, B, C, and D, group II comprising cores E, F, G, and H, group III comprising cores I, J, K, and L, and group IV comprising cores M, N, O, and P.

Groups I and III correspond to the axis referenced Y in FIG. 1. By powering the suspension windings in group I, the rotor is attracted radially in the direction of the arrow on the Y-axis, and by powering group III the rotor is attracted radially in the opposite direction from that of the arrow on the Y-axis.

In the same way, groups II and IV correspond to the axis referenced X in FIG. 1. By powering the windings in group II, or in group IV, the rotor is attracted radially either in the direction of the arrow on the X-axis (group II), or in the opposite direction (group IV).

For reasons of clarity, only the position-detection coils and the suspension windings on the Y-axis are shown in FIG. 1, given that the principle used for disposing the coils and the windings in groups II and IV on the X-axis is absolutely identical.

Each core A, B, C, and D in group 1 is equipped with a position-detection electric coil: core A having a coil 3 wound clockwise (when seen from the rotor looking towards the core in question); core B having a coil 4 wound anticlockwise; core C having a coil 5 wound clockwise, and core D having a coil 6 wound anticlockwise. The four coils 3, 4, 5, and 6 are connected together in series, and they form group I which is in turn connected in series with group III which comprises coils 7, 8, 9, and 10 mounted respectively on cores I, J, K, and L and in turn connected together in series. Coils 7, 8, 9, and 10 are wound in the winding directions represented by the same well-known symbols as those used for group I.

Groups I and II are thus powered in series via conductors 11 and 12 with AC current, e.g. at a frequency of 20 kHz (preferably in the range 10 kHz to 100 kHz).

With respect to the winding directions of the coils, the magnetic flux produced by the AC powering current at any determined time must be in opposite directions in the first two cores A and B. For example, the flux in the two cores A and B at any determined time flows in the directions represented by the dashed line provided with arrows referenced 13. In the same way, for cores C and D, the flux must be in opposite directions: the dashed line referenced 14 represents the flux produced by coils 5 and 6 in the cores, with the direction in which the flux circulates at any determined time being shown by arrows. In contrast, the respective directions of the flux in cores B and C are unimportant. The directions may be as shown, but equally they could be otherwise. All that matters is that the flux in A and B is in respective directions that are opposite from each other, and the same applies for C and D. In the same way, in group III: the flux in I and J must be in respective opposite directions, and the flux in K and L must be in respective opposite directions.

The dashed line with arrows 15 represents the direction of the flux produced by coils 7 and 8, and the dashed line with arrows 16 represents the direction of the flux produced by coils 9 and 10. Arrows are placed on the powering wires 11 and 12 to represent the direction of the current at any given time which direction corresponds to the flux direction that is also indicated by the arrows on lines 15 and 16, given the winding directions indicated by the symbols $\otimes$ and .

To resume, at any given time, the magnetic flux in the first two cores of each group must be in respective directions that are opposite from each other, the same applying for the last two cores in each group, and this result can be obtained with other winding directions than those shown in FIG. 1.

A tapping point 17 is made between the two groups I and III connected in series. The tapping point is used for measuring position, and this is explained below with reference to FIG. 3.

As stated above, each group also has suspension windings which are powered independently from one another. Only group I is described below, given that it is identical for the other three groups. The windings in group III are nevertheless shown in FIG. 1.

For the suspension windings, at any determined time, the magnetic flux produced by the windings must be in the same direction in both of the first two cores: A and B for group I, and must be in the opposite direction in the other two cores: C and D (same direction in C and D, which same direction is opposite from that in both A and B).

Figure 2:
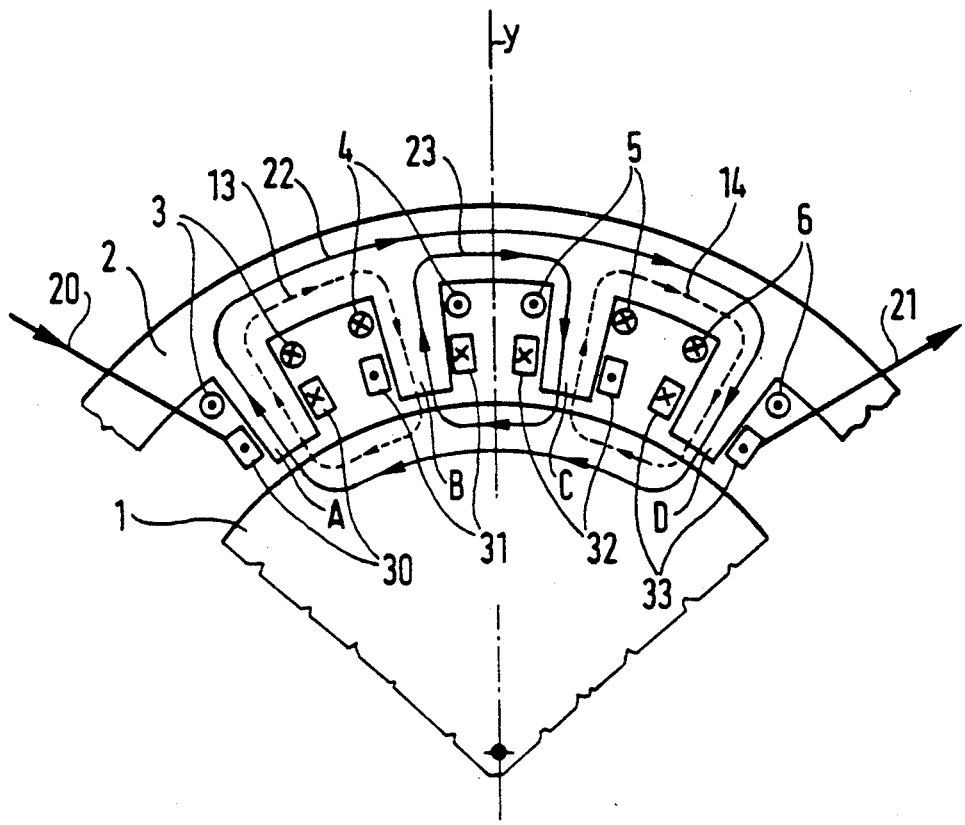
FIG. 2 is a fragmentary diagrammatic view showing a variant on FIG. 1.

FIG. 1 shows an example enabling this result to be obtained. FIG. 2 (described below) gives another example.

FIG. 1 shows two suspension windings referenced 18 and 19, connected together in series, and powered by the end conductors 20 and 21. Winding 18 surrounds cores A and B together, and winding 19 surrounds cores C and D together. They are wound in opposite directions from each other, as shown by the winding direction symbols: and . The circle used for the coils is replaced by a rectangle to distinguish the suspension windings from the position-detection coils. The magnetic flux produced by the two windings is represented by the two solid lines 22 and 23 with the direction in which the flux circulates being indicated by the arrows on said lines, and corresponding to a current in the direction also indicated by arrows shown on the powering conductors 11 and 12.

In this case, the current may be DC or AC.

The same applies for the other groups II, III, and IV. In group III opposite from group I, the two windings are referenced 24 and 25, with the powering conductors 26 and 27 and the flux lines 28 and 29 being drawn as solid lines.

FIG. 2 is a fragmentary diagram showing a variant embodiment giving the same result. In this case, there are four suspension windings: 30, 31, 32, and 33, i.e. one per core. The first two windings 30 and 31 are both wound in the same direction, and the following two windings 32 and 33 are both wound in the opposite direction from the first two. All four windings are connected together in series. In FIG. 2, the lines 13 and 14 representing the flux produced by the position-detection coils are not shown so as not to clutter the figure which, except for the suspension windings, is identical to FIG. 1.

With reference to FIG. 1, and to group I only, since it is identical for the other groups, the magnetic flux produced by suspension windings 18 and 19 does not influence the position-detection cons. The magnetic flux produced by suspension winding 18 is shared equally in the two cores A and B, and flows through them in the same direction. However, with respect to the two position-detection coils 3 and 4, the suspension flux flows through detection coil 3 in the same direction as the detection flux produced thereby, but the suspension flux flows through detection coil 4 in the opposite direction from the flux produced thereby. As a result, for the two detection coils 3 and 4 connected together in series, the suspension flux flowing through them is zero. In this way the detection coils are not influenced by the flux produced by the suspension windings, thereby considerably simplifying the position-detection electric circuit whose principle is described below with reference to FIG. 3. Exactly the s&ne is true of the other two coils 5 and 6 through which the magnetic flux produced by suspension winding 19 flows positively and negatively (relative to the direction of the flux that the two coils produce themselves).

The principle used for measuring the position of the rotor relative to the stator is explained below with reference to FIG. 3, for the Y-axis, given that the principle is identical for the X-axis, with the measurement being taken by the detection coils that are placed on the groups of cores II and IV, and that are connected in an electric circuit identical to the one shown in FIG. 3.

Figure 3:
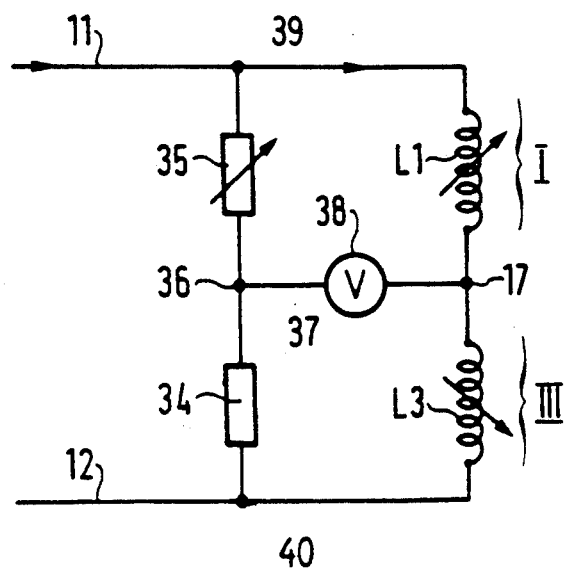
FIG. 3 is an electric circuit diagram illustrating the measurement principle used for detecting position.

In FIG. 3, the position-detection coils in group I are represented by the variable inductor L1, and those in group III are represented by the variable inductor L3. Depending on the position of the rotor 1 relative to the stator 2, the reluctance of the magnetic circuit varies, and therefore so does the coefficient of self-induction L of the coils.

In this way, the two groups I and III are powered in series by the power conductors 11 and 12 supplying power across a diagonal at bridge connecting points 39, 40 by means of a high-frequency (in the approximate range 10 kHz to 100 kHz) AC current. They are mounted in a measuring bridge including an impedance component 34 and a variable impedance component 35 enabling the bridge to be adjusted to obtain equilibrium (zero voltage across a diagonal 37 between trapped points 17, 36 equipped with a measuring instrument 38) when the rotor is almost perfectly centered in the stator (relative to the Y-axis). Depending on whether or not the rotor is off center in either direction, the voltage measured by the apparatus 38 is positive or negative and a function of the value by which the rotor is off center. Current is then caused to flow through the suspension windings in group I or in group III, as applicable.

We claim:

1. In an electromagnetic bearing for radially suspending a rotor in a stator, the bearing including a magnetic circuit comprising a rotor first portion integral with said rotor, and a stator second portion integral with said stator, said stator portion including a plurality of magnetic cores facing the rotor first portion and equipped both with position-detection electric coils, powered by a detection AC electric current, and also with suspension electric windings powered by power currents, the improvement wherein said stator portion of the magnetic circuit includes sixteen of said magnetic cores divided into four groups of four consecutive cores, the four groups being referred to respectively as group I, group II, group III, and group IV and succeeding one another in that order, groups I and III corresponding to radial action along a Y-axis and in respective opposite directions, and groups II and IV corresponding to radial action along an X-axis perpendicular to the Y-axis and in respective opposite directions, each core in each group being equipped with said position-detection electric coil, the coils on the four cores in anyone group being connected together in series, and the respective winding directions of the coils on the cores being such that, at any determined time, the magnetic flux produced by the AC powering current is in opposite directions in the first two cores of the group, and also in opposite directions in the following two cores, and wherein each group is further equipped with said suspension electric windings disposed on the cores of the group such that, at any determined time, the magnetic flux produced by the powering current is in the same direction in the first two cores of the group, and in the opposite direction in the following two cores, and wherein the windings in each group are powered separately, whereby said position-detection electric coils are not influenced by the magnetic flux of the suspension electric windings.

2. An electromagnetic bearing according to claim 1, wherein the position-detection electric coils in groups I and III are connected together and powered in series, and, in the same way, the coils in groups II and IV are connected together and powered in series.

3. An electromagnetic bearing according to claim 1, wherein each group of cores is equipped with two suspension electric windings, the first suspension electric winding surrounding the first two cores of the group together, and the second suspension electric winding surrounding the third and fourth cores of the group together, and the two suspension electric windings being connected together and powered in series.

4. An electromagnetic bearing according to claim 1, wherein each group of cores is equipped with four suspension electric windings connected together and powered in series, one suspension electric winding being disposed on each core of the pump.

5. An electromagnetic bearing according to claim 2, wherein said position-detection coils are powered by AC of fixed amplitude, and wherein each set of two groups of position-detection coils connected in series is mounted in a measuring bridge having two diagonals which is balanced when the rotor is centered in the stator along the X-axis or the Y-axis corresponding to the two groups of position-detection coils connected in series, the bridge being powered via one of said two diagonals, with the other of said two diagonals being used to measure the imbalance voltage corresponding to the rotor moving off-center.

6. An electromagnetic bearing according to claim 5, wherein said AC position-detection current is at a frequency lying in the range 10 kHz to 100 kHz.

* * * * *